Jan. 1, 1952

G. J. MORGENTHALER 2,581,277

OIL FILTER

Filed Dec. 17, 1946

2 SHEETS—SHEET 1

Inventor
Gottlieb J. Morgenthaler

By Clarence A. O'Brien
and Harvey B. Jacobson
Attorneys

Jan. 1, 1952  G. J. MORGENTHALER  2,581,277
OIL FILTER

Filed Dec. 17, 1946  2 SHEETS—SHEET 2

Inventor
Gottlieb J. Morgenthaler

By Clarence A. O'Brien
and Harvey B. Jacobson
Attorneys

Patented Jan. 1, 1952

2,581,277

UNITED STATES PATENT OFFICE 2,581,277

OIL FILTER

Gottlieb J. Morgenthaler, Philadelphia, Pa.

Application December 17, 1946, Serial No. 716,835

3 Claims. (Cl. 210—134)

The present invention relates to new and useful improvements in oil filters and more particularly to filters of the type used with internal combustion engines for filtering the oil as it is pumped from the crank case.

An important object of the present invention is to provide a settling chamber into which the oil from the crank case is supplied to collect sludge and foreign substances and then pass the oil upwardly from the settling chamber through successive layers of filtering elements to thoroughly remove impurities therefrom before returning the same into the engine.

It is also an object of the invention to heat the oil before entering the collecting chamber to more effectively separate the foreign substances therefrom, the temperature of the oil being reduced as it passes through the filter and to again reheat the oil to the temperature of the water circulating system of the engine before the oil is returned to the engine to thus supply filtered oil to the engine at the operating temperature thereof.

A still further object of the invention is to provide an oil filter including a plurality of layers of filtering material held in a compressed condition and providing means for adjusting the pressure to which the filtering material is subjected.

An additional object is to provide a filter of this character in which the layers of filtering material may be easily removed for cleaning or replaced when desired.

An additional object is to provide a filter of the character specified of simple and practical construction, which is efficient and reliable in operation, relatively inexpensive to manufacture and install in operative position on an engine without necessitating any material changes or alterations in the construction thereof and which otherwise is well adapted for the purposes for which the same is intended.

Figure 1:
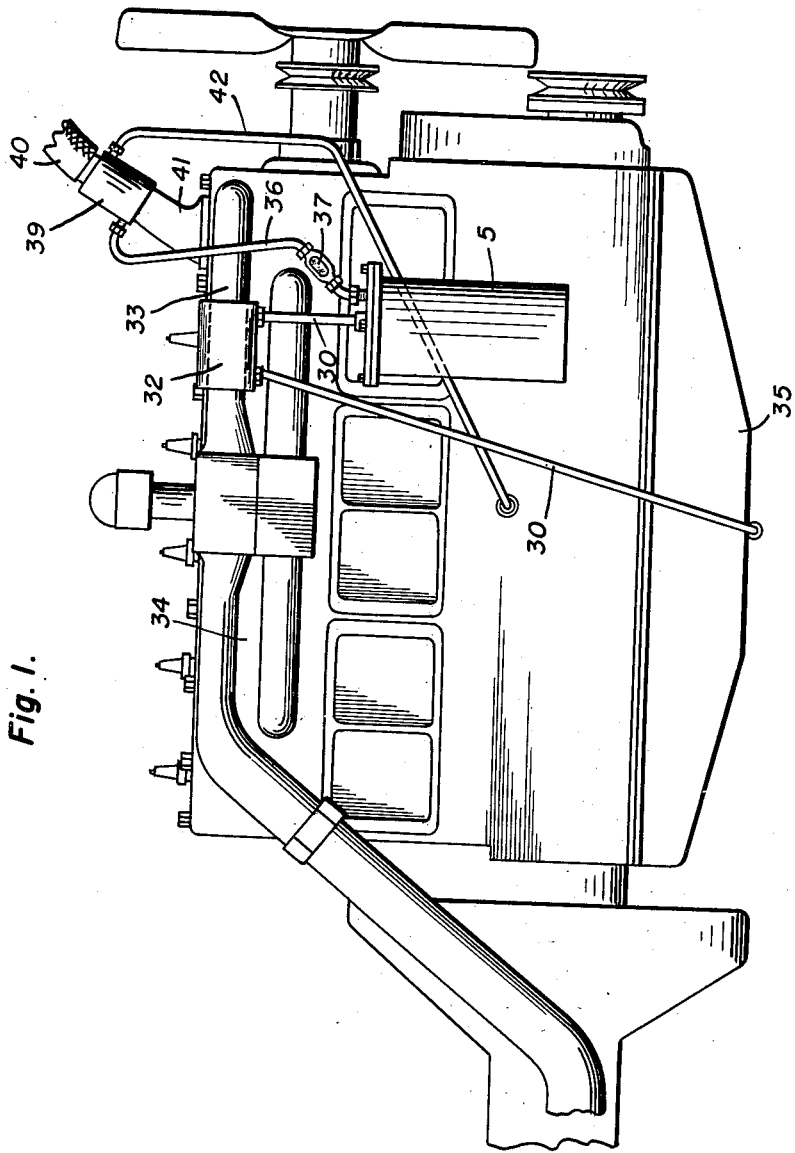
Figure 2:
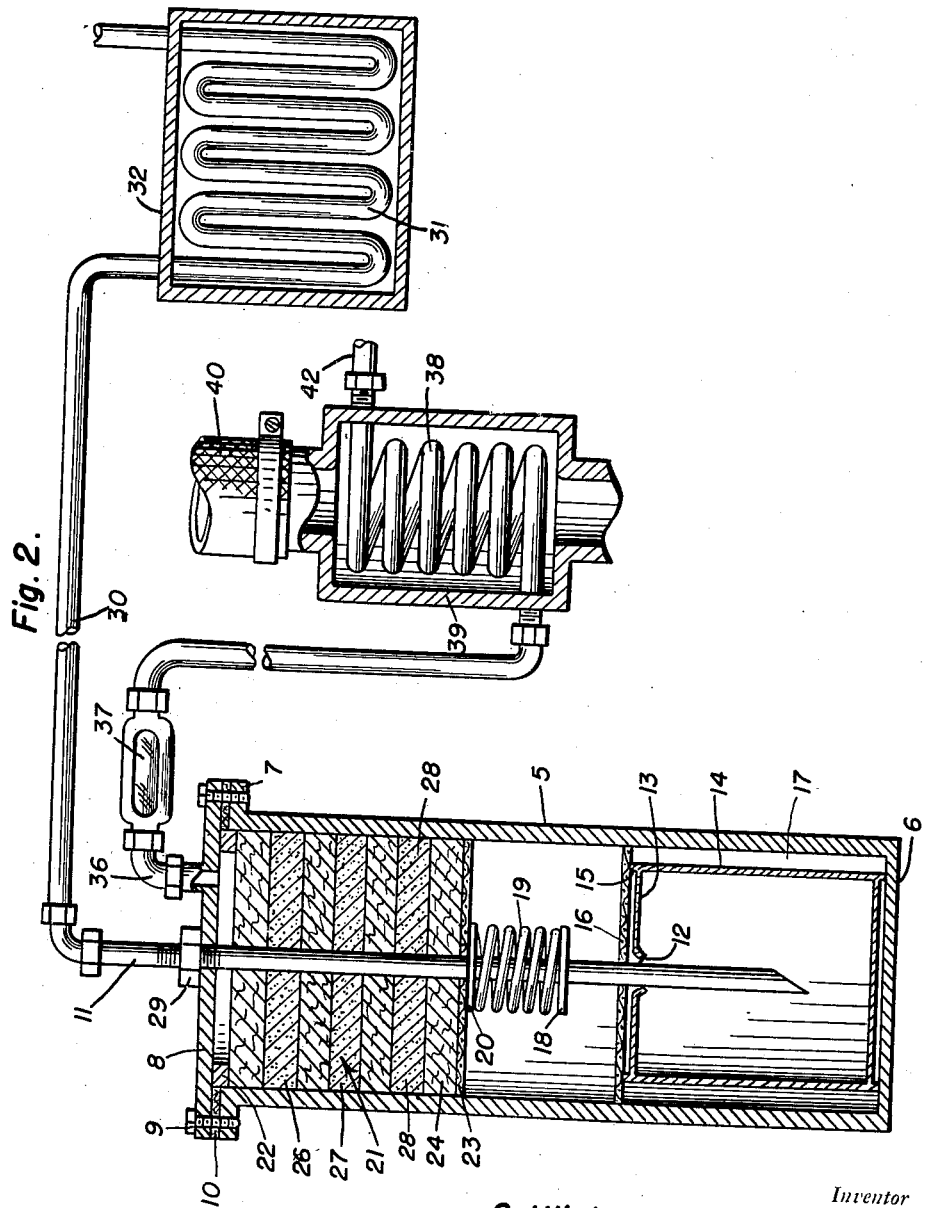

Other objects and advantages reside in the details of construction and operation as more fully described hereinafter and claimed, reference being had to the accompanying drawings forming part hereof, wherein like numerals refer to like parts throughout, and in which:

Figure 1 is a side elevational view showing the filter in position attached to an engine, and Figure 2 is a vertical sectional view of the filter and temperature regulating coils for the oil supplied to the filter and returned to the engine and shown removed from the engine.

Referring now to the drawings in detail wherein for the purpose of illustration I have disclosed a preferred embodiment of the invention the numeral 5 will designate the filter case of cylindrical construction having a closed bottom 6 and a flange 7 at its upper edge. A cover plate 8 is secured to the flange 7 by bolts or the like 9 and with a gasket 10 positioned between the cover and the flange.

A tube 11 extends downwardly through the cover 8 with the lower discharge end of the tube extending through an opening 12 in the top 13 of a can 14 positioned in the bottom of the filter case 5, the lower end of the tube being supported above the bottom of the can as shown in Figure 2 of the drawings.

An annular flange 15 extends upwardly from top 13 of the can and on which a filtering screen 16 is supported to space the screen above the top 13 of the can. The opening 12 in the top 13 of the can is of a diameter greater than the diameter of the tube 11 to permit upward flow of oils from the can after entering the can from the tube 11.

The sides of the can 14 are spaced from the walls of the case 5 to provide a cooling chamber 17 surrounding the can 14.

A flange 18 is welded or otherwise suitably secured to the tube 11 above the screen 16 forming an abutment for the lower end of a coil spring 19 mounted on the tube, the upper end of this spring bearing against the washer 20 mounted on the tube and which engages the bottom of a plurality of layers of filtering material 21 to compress the filtering material upwardly against a spacer gasket or ring 22 under the cover 8 of the filter case 5.

The layers of filtering material 21 include a lower screen 23 above which is spaced alternate layers of corrugated cellulose 24 and layers of fuller's earth 26, 27 and 28 in disk form. A layer of corrugated cellulose is positioned above and below the layers of fuller's earth and the layers of fuller's earth include an upper fine layer 26, an intermediate medium layer 27 and a lower coarse layer 28.

The layers of filtering material are held in a compressed condition by the spring 19 and the tension of the spring is adjusted by means of a nut 29 threaded on the upper portion of the tube 11 and bearing against the cover 8.

The upper end of the tube 11 is connected to a pipe 30 having a coil 31 formed therein and enclosed in a casing 32 surrounding the exhaust manifold 33 of an internal combustion engine 34. The pipe 30 extends from the coil 31 to the crank case 35 of the engine where oil is pumped from the crank case through the coil and through the tube 11 into the can 14 which forms a sediment trap or collecting chamber.

A return pipe 36 is connected to the cover 8, the return pipe having a sight glass 37 connected therein immediately adjacent the filter case 5, the return pipe then leading to a coil 38 positioned in a casing 39 connected between the radiator hose 40 and water jacket connection 41 for the engine. A pipe 42 extends from the coil 38 to the engine above the crank case as shown in Figure 1.

In the operation of the device oil from the crank case 35 is pumped through the pipe 30 passing through the coil 31 where the oil is heated by the exhaust manifold 33 and then enters the sediment collecting trap 14 by way of the tube 11. Sludge and foreign substances are trapped in the sediment collecting can 14 and the oil then passes from the can upwardly into the opening 12 in the top thereof and upwardly through the screen 16.

The screen 16 is spaced below the screen 23 at the bottom of the filtering element 21 to provide a chamber for the oil after leaving the can 14 and the oil also enters the chamber 17 surrounding the can 14 to lower the temperature of the oil by reason of its contact with the walls of the case 5. The chamber between the screens 16 and 23 enables the rapid flow in the oil to subside to a period of comparative inactivity and thus to more effectively trap the sludge and sediments in the bottom of the can 14. The constant feeding of the oil to the can 14 through the tube 11 forces the oil upwardly through the successive layers of filtering material to remove impurities therefrom and during which the oil is gradually cooled.

The purified oil leaves the filter case 5 through the return pipe 36 where the condition of the purified oil may be observed through the sight window 37. As the oil passes through the coil 38 the same is again heated to the temperature of the water circulation system before the oil is returned to the engine through the pipe 42.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What is claimed as new is:

1. An oil filter comprising a cylindrical case closed at its bottom, a cover secured to the top of the case and having an outlet, a sediment container in the bottom of the case having an upstanding flange at its upper edge forming a recessed top having an opening, a lower filtering element resting on the flange of the sediment container and forming a chamber at the top of the sediment container, a feed tube extending downwardly in the case through the cover and through the opening in the sediment container, said tube having a clearance in the opening to provide an outlet for the sediment container for the escape of oil upwardly through the opening into the case, an upper filtering element in the top of the case, and composed of superposed layers of filtering material, a spacer ring between the upper filtering element and the cover, and spring means carried by the tube above the lower filtering element and holding said layers of the upper filtering element compressed against the spacer ring.

2. An oil filter comprising a cylindrical case closed at its bottom, a cover secured to the top of the case and having an outlet, a sediment container in the bottom of the case having an upstanding flange at its upper edge forming a recessed top having an opening, a lower filtering element resting on the flange of the sediment container and forming a chamber at the top of the sediment container, a feed tube extending downwardly in the case through the cover and through the opening in the sediment container, said tube having a clearance in the opening to provide an outlet for the sediment container for the escape of oil upwardly through the opening into the case, an upper filtering element in the top of the case, and composed of a plurality of layers of filtering material, and spring means carried by the tube supporting the upper filtering element spaced vertically above the lower filtering element to provide a chamber therebetween in which oil leaving the sediment container is held substantially dormant before passing through the upper filtering element.

3. An oil filter comprising a cylindrical case closed at its bottom, a cover secured to the top of the case and having an outlet, a sediment container in the bottom of the case having an upstanding flange at its upper edge forming a recessed top having an opening, a lower filtering element resting on the flange of the sediment container and forming a chamber at the top of the sediment container, a feed tube extending downwardly in the case through the cover and through the opening in the sediment container, said tube having a clearance in the opening to provide an outlet for the sediment container for the escape of oil upwardly through the opening into the case, an upper filtering element in the top of the case, and composed of a plurality of layers of filtering material, spring means carried by the tube supporting the upper filtering element spaced vertically above the lower filtering element to provide a chamber therebetween in which oil leaving the sediment container is held substantially dormant before passing through the upper filtering element, and means for vertically adjusting the tube in the cover for regulating compressing action on the upper filtering element by the spring.

GOTTLIEB J. MORGENTHALER.

REFERENCES CITED

The following references are of record in the file of this patent:

UNITED STATES PATENTS

| Number | Name | Date |
| --- | --- | --- |
| 1,582,859 | Shepard | Apr. 27, 1926 |
| 1,723,945 | McCutcheon | Aug. 6, 1929 |
| 1,822,452 | Pelletier | Sept. 2, 1931 |
| 1,872,430 | Ericson | Aug. 16, 1932 |
| 1,914,195 | Court | June 13, 1933 |
| 2,007,615 | Ross | July 9, 1935 |
| 2,200,795 | Krieck | May 14, 1940 |
| 2,211,305 | Werder | Aug. 13, 1940 |
| 2,262,527 | Fairlie | Nov. 11, 1941 |
| 2,415,246 | Hunt | Feb. 4, 1947 |
| 2,459,376 | Hallinan | Jan. 18, 1949 |

FOREIGN PATENTS

| Number | Country | Date |
| --- | --- | --- |
| 3,315 | Great Britain | of 1870 |